United States Patent
Matham et al.

(10) Patent No.: US 11,436,122 B1
(45) Date of Patent: Sep. 6, 2022

(54) KEY PERFORMANCE INDICATOR RECOMMENDATIONS BASED ON RELEVANCY RANKING

(71) Applicant: Cisco Technology, Inc., San Jose, CA (US)

(72) Inventors: Siva Sunil Kumar Matham, Fremont, CA (US); Ramanathan Lakshmikanthan, Santa Clara, CA (US); Selvakumaran N. Subramanian, Pleasanton, CA (US); Qun Song, Bellevue, WA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 174 days.

(21) Appl. No.: 16/872,537

(22) Filed: May 12, 2020

Related U.S. Application Data

(60) Provisional application No. 62/846,919, filed on May 13, 2019.

(51) Int. Cl.
| | |
|---|---|
| G06F 16/24 | (2019.01) |
| G06F 11/34 | (2006.01) |
| G06F 16/2457 | (2019.01) |
| G06F 11/30 | (2006.01) |
| H04L 41/0853 | (2022.01) |
| H04L 43/065 | (2022.01) |
| G06N 5/04 | (2006.01) |

(52) U.S. Cl.
CPC ...... *G06F 11/3495* (2013.01); *G06F 11/3006* (2013.01); *G06F 16/24578* (2019.01); *G06N 5/04* (2013.01); *H04L 41/0853* (2013.01); *H04L 43/065* (2013.01)

(58) Field of Classification Search
CPC ................ G06F 11/3495; G06F 16/24578
See application file for complete search history.

(56) References Cited

U.S. PATENT DOCUMENTS

| | | | |
|---|---|---|---|
| 5,432,932 A * | 7/1995 | Chen | G06F 11/32 715/965 |
| 5,892,928 A * | 4/1999 | Wallach | H04L 49/9063 710/72 |
| 8,767,019 B2 | 7/2014 | Heinrich et al. | |
| 11,132,373 B1 * | 9/2021 | Timko | G06F 11/3495 |

(Continued)

FOREIGN PATENT DOCUMENTS

EP 2487869 B1 5/2014

*Primary Examiner* — Eliyah S. Harper
(74) *Attorney, Agent, or Firm* — Edell, Shapiro & Finnan, LLC

(57) ABSTRACT

Presented herein are embodiments for quickly identifying and recommending key performance indicators (KPIs) for network devices based on the type of network device and/or role of the device. The type or configuration of the network device may be obtained and compared to the capabilities of the network device. Operational or performance information of the network device, represented by strings, may be obtained based on the configuration information. Operational information that is not relevant to the configuration of the network device may be filtered out. The remaining operational information may be ranked as KPIs based on a relevance of the operational information with respect to the configuration information.

20 Claims, 6 Drawing Sheets

(56) References Cited

U.S. PATENT DOCUMENTS

| | | | |
|---|---|---|---|
| 2006/0107255 A1* | 5/2006 | Chagoly | G06F 11/3495 |
| | | | 714/E11.202 |
| 2007/0260931 A1* | 11/2007 | Aguilar-Macias | |
| | | | G06F 11/3476 |
| | | | 714/39 |
| 2011/0141923 A1 | 6/2011 | Young et al. | |
| 2011/0179016 A1* | 7/2011 | Narula | G06F 16/245 |
| | | | 707/721 |
| 2012/0016681 A1* | 1/2012 | Joergensen | G06F 11/3409 |
| | | | 709/224 |
| 2013/0166634 A1* | 6/2013 | Holland | H04L 67/22 |
| | | | 709/203 |
| 2014/0157061 A1* | 6/2014 | Bird | G06F 11/3495 |
| | | | 714/47.1 |
| 2016/0292611 A1 | 10/2016 | Boe et al. | |
| 2019/0147363 A1 | 5/2019 | Maheshwari et al. | |
| 2019/0187865 A1* | 6/2019 | Gresham | G06F 11/3495 |
| 2020/0042370 A1 | 2/2020 | Kao et al. | |

* cited by examiner

```
ospf running_cfg tree:
ospf
└── processes
    └── process
        ├── default-vrf
        │   ├── area-addresses
        │   │   └── area-area-id
        │   │       ├── area-id
        │   │       ├── name-scopes
        │   │       │   └── name-scope
        │   │       │       ├── interface-name
        │   │       │       ├── bfd
        │   │       │       │   └── interval
        │   │       │       ├── running
        │   │       │       └── cost
        │   │       └── running
        │   ├── mpls-traffic-eng
        │   ├── mpls
        │   │   └── mpls-router-id
        │   │       └── interface-name
        │   ├── ucmp
        │   │   └── enable
        │   │       └── variance
        │   └── router-id
        ├── nsr
        ├── vrfs
        │   └── vrf
        │       ├── area-addresses
        │       │   └── area-area-id
        │       │       ├── name-scopes
        │       │       │   └── name-scope
        │       │       │       ├── running
        │       │       │       └── interface-name
        │       │       ├── area-id
        │       │       └── running
        │       ├── vrf-start
        │       └── vrf-name
        ├── process-name
        └── start
```

FIG.3

Crosswork Network Automation

/ Health Insights / Manage KPI Profiles / Create Profile

Create New Profile

Profile Name ⊘ [ ]   Description [ ]

Add KPIs to Profile

○ All KPIs   ● Recommended KPIs

Select a sample device ⊘

▽ Type to filter by tags

| State | Name |
|---|---|
| ○ ⊘ | ncs5501-5 |
| ○ ⊘ | ncs5501-6 |
| ⦿ ⊘ | robot-b15-asr9k-1 |
| ○ ⊘ | robot-b15-asr9k-2 |
| ○ ⊘ | ncs5501-3 |
| ○ ⊘ | ncs5501-4 |

↙ 502

Name [ ]

☐ CPU threshold
☐ CPU utilization
☐ CEF drops
☐ LLDP neighbors
☐ Layer 1 optical alarms
☐ Layer 1 optical errors
☐ Layer 1 optical FEC errors
☐ Layer 1 optical power
☐ Layer 1 optical temperature
☐ Layer 1 optical voltage
☐ Ethernet port error counters
☐ Ethernet port packet size distribution
☐ Ethernet port packet statistics

↙ 504

Sidebar: Home, Change Automation, Health Insights, Network Visualization, Device Management, Admin

KEY PERFORMANCE INDICATOR RECOMMENDATIONS BASED ON RELEVANCY RANKING

CROSS-REFERENCE TO RELATED APPLICATION

This application claims priority to U.S. Provisional Application No. 62/846,919, filed May 13, 2019, the entirety of which is incorporated herein by reference.

TECHNICAL FIELD

The present disclosure relates to monitoring telemetry of one or more network devices, and more specifically, to determining key performance indicators that reflect the performance of the one or more network devices.

BACKGROUND

In a network operations center, key performance indicators may be used by operators to monitor the health of the network. Given the various devices and roles of devices in a network, there may be several key performance indicators that could be used. However, there may not be an intuitive approach to selecting appropriate key performance indicators for each network device and role.

BRIEF DESCRIPTION OF THE DRAWINGS

FIG. 3 is a node tree representing strings corresponding to configuration information representing configurations of a network device, in accordance with an example embodiment.

FIG. 5 is a diagram of a graphical user interface illustrating recommended key performance indicators generated according to the techniques presented herein, in accordance with an example embodiment.

DESCRIPTION OF EXAMPLE EMBODIMENTS

Overview

In one embodiment, a solution is presented for quickly identifying and recommending key performance indicators (KPIs) for network devices based on the type of network device and/or role of the device. The type or configuration of the network device may be obtained and compared to the capabilities of the network device. Operational or performance information of the network device, represented by strings, may be obtained based on the configuration information. Operational information that is not relevant to the configuration of the network device may be filtered out. The remaining operational information may be ranked as KPIs based on a relevance of the operational information with respect to the configuration information.

Example Embodiments

The present disclosure relates to monitoring performance of network devices in a network based on telemetry reports sent by network devices. More specifically, techniques are provided for determining and recommending key performance indicators based on a relevancy ranking derived from determining the configurations set on a network device. Key attributes may be identified that are relevant for a given network device based on the type of device, configuration(s) of the device, and/or role of the device in a network. Beginning with a list of key performance indicators (KPIs), any irrelevant KPIs may be filtered out based on a comparison of the KPIs metadata with capabilities of the device like transport (SSH, MDT, gRPC Network Management Interface (GNMI)) and technology (Simple Network Management Protocol (SNMP), Openconfig, Yet Another Next Generation (YANG) model revisions), and an algorithm is provided that may select remaining KPIs that are relevant to the configuration of the device for monitoring.

Figure 1:
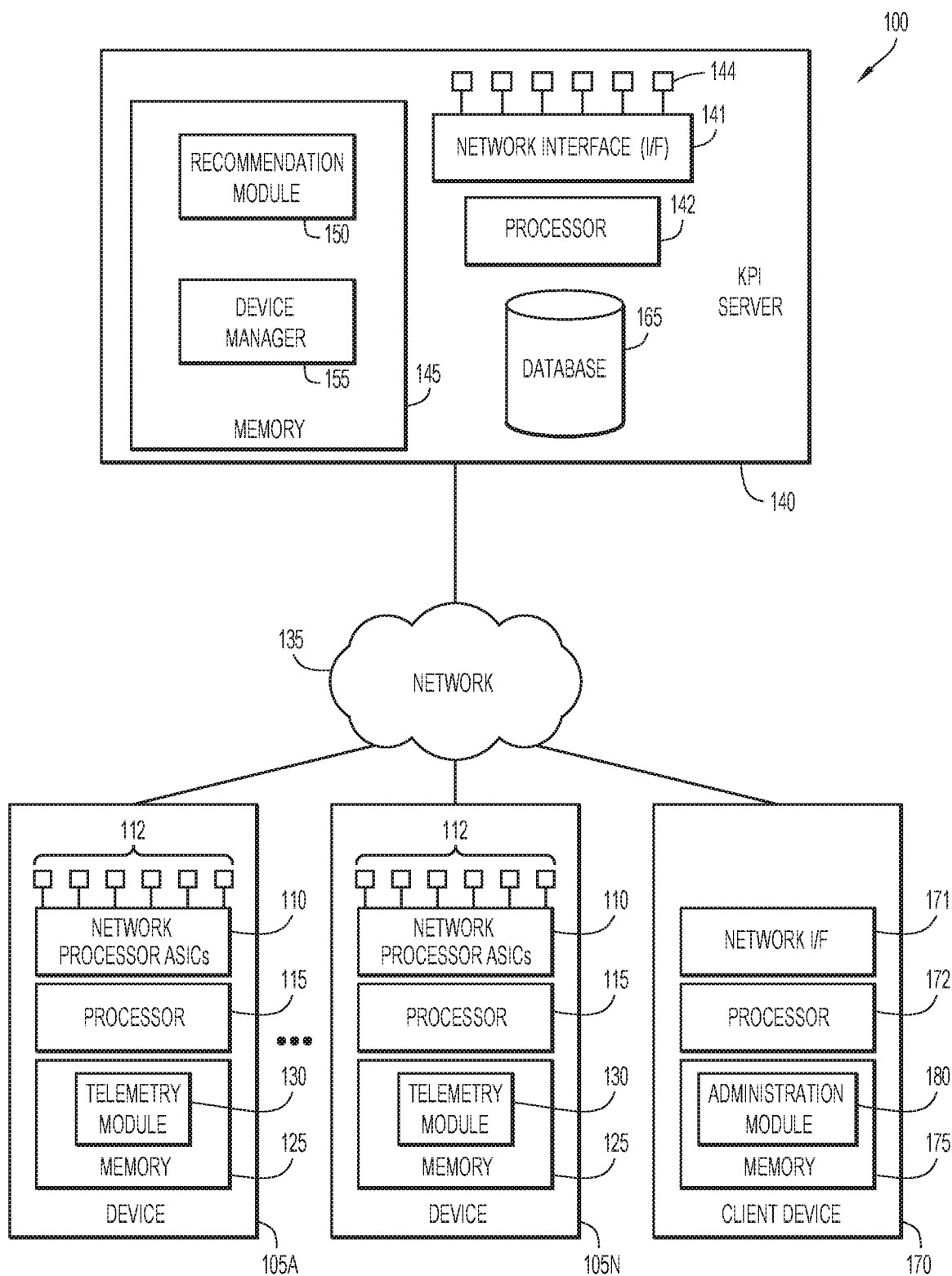
FIG. 1 is a block diagram depicting a network environment that is configured to generate key performance indicators to be used in monitoring performance of one or more network devices in a network, in accordance with an example embodiment.

Embodiments are now described in detail with reference to the figures. FIG. 1 is a block diagram depicting a network environment 100 in which techniques for recommending key performance indicators may be employed, in accordance with an example embodiment. As depicted, network environment 100 includes a plurality of network devices 105A-105N, a network 135, a KPI server 140, and a client device 170. It is to be understood that the functional division among components of network environment 100 have been chosen for purposes of explaining the embodiments and is not to be construed as a limiting example.

Each network device 105A-105N may include a network interface (I/F) having a network processor application specific integrated circuits (ASIC(s)) 110, and one or more network ports 112, a controller 115 (e.g., a processor and/or microprocessor), and memory 125. The memory 125 stores software instructions for telemetry module 130, as well as various other data involved in operations performed by the controller 115. In various embodiments, network devices 105A-105N may include any programmable electronic device capable of executing computer readable program instructions. Network devices 105A—105N may thus include any network devices, such as routers, switches, firewalls, gateways, etc., that perform network functions. Each network device 105A-105N may include internal and external hardware components, as depicted and described in further detail with respect to FIG. 6. To this end, the memory 125 may store network processing parameters (routing tables, etc.) and the network interface may include other components employed in a network device.

Telemetry module 130 may collect data relating to a device's health and performance and transmit the collected data to one or more network-accessible recipients, such as KPI server 140. Telemetry module 130 may collect data corresponding to any data type, format, or protocol, including telemetry data that follows a YANG model, telemetry data that correspond to a Simple Network Management Protocol (SNMP), a Common Layer Interface (CLI) format, and any other format.

Network 135 may include a local area network (LAN), a wide area network (WAN) such as the Internet, or a combination thereof, and includes wired, wireless, or fiber optic connections. In general, network 135 can use any combination of connections and protocols that support communications between devices 105A-105N, KPI server 140, and/or client device 170.

KPI server 140 includes a network interface (I/F) 141 with one or more network ports 144, a controller 142 (e.g., a processor and/or microprocessor), memory 145, and a database 165. The memory 145 stores software instructions for a recommendation module 150 and a device manager 155, as well as various other data involved in operations performed by the controller 142. In various embodiments, KPI server 140 may include any programmable electronic device capable of executing computer readable program instructions. KPI server 140 may include internal and external hardware components, as depicted and described in further detail with respect to FIG. 6. Although the database 165 is depicted as being part of the KPI server, it may be a separate device connected to the KPI server via the network 135.

In some implementation, the KPI server 140 may include a predefined set of KPIs. In some implementations, the KPI server may further include user defined KPIs. Each KPI and its metadata may be persisted, or stored, in local file storage on KPI server 140 or on database 165. For example, a KPI may include a "set of sensors". Each sensor of the set of sensors may be represented by a string. The string may represent a specific operational metric from a network device to be monitored. In some implementations, the string of the sensor may be represented by a hierarchy of objects for a unique metric called a "leaf" following the data model. For example, the data model may be a YANG model or Simple Network Management Protocol (SNMP) management information base (MIB) model. All of the strings from each of the sensors that are part of a KPI may represent the KPI. In some implementations, the KPIs may include other meta-data like supported device vendors, operating systems, YANG/SNMP model and revision requirements. The recommendation module 150 may include business logic for deduction of a KPI metric based on the sensor metrics.

Recommendation module 150 and device manager 155 may include one or more modules or units to perform various functions of the embodiments described below. Recommendation module 150 and device manager 155 may be implemented by any combination of any quantity of software (and/or hardware modules or units) and may reside within memory 145 of KPI server 140 for execution by a processor, such as processor 142. Recommendation module 150 may be configured to refer to a desired KPI by the strings from a set of sensors that correspond to the KPI.

Recommendation module 150 may recommend KPIs in order to monitor the health of devices, such as devices 105A-105N, in a network. In particular, recommendation module 150 may begin with a list of KPIs that may be retrieved from a KPI library. For a given device, recommendation module 150 may filter out any KPIs that are not applicable based on key attributes of the device, including the device type and the capabilities of the device. The key attributes may be determined based on configuration information of the device. For example, a device may be capable of performing a set of operations but configured to perform a subset of operations. The device may generate operational information relating to the full set of operations the device is capable of when performing the subset of operations. The operational information may be used as KPIs for monitoring the device's performance and/or health of the network. However, the operational information relating to operations the device may be capable of, but not performing, may not be applicable to monitoring the performance of device.

Thus, operational information relating to operations not being performed by the device may be determined to be inapplicable to the device's performance and may be filtered out.

Once inapplicable KPIs are filtered out, recommendation module 150 may employ an algorithm to rank the remaining KPIs based on the relevancy of each KPI to a device's configuration. The relevancy ranking algorithm may use KPI sensor information that has been processed into a set of words (e.g., a set of tokens or a string). Moreover, a processed set of tokens from the configuration of the device may be used. A heuristic may be used to score each of the sensor strings from the KPI using domain specific word lists derived from the vocabulary (e.g., all set of words from device operational and configuration strings from a YANG or SNMP model). Each of these scores are combined to provide a score for each of the KPIs. In some embodiments, datasets may include sensor leaves from model driven telemetry and/or YANG modules. The ranking algorithm may rank operational sensors based on the relevance and/or importance with respect to the device's configuration. For example, the relevance and/or importance of an operational sensor may be determined by comparing a set of tokens making up a sensor string to a whitelist, a blacklist, and/or greylist. Recommendation module 150 may then present a set of one or more recommended KPIs that are of interest to a device based on the device's type, role, and configuration.

Device manager 155 may manage network devices, such as devices 105A-105N, by registering devices with KPI server 140. Device manager 155 may maintain a listing of devices and information for each device, such as current configurations of devices, software packages installed on devices, statuses of devices, roles of devices, and the like.

In some implementations, the database 165 may be a structured set of data stored in a non-volatile storage media known in the art. In some implementations, the database 165 may include any non-volatile storage media known in the art. For example, database 165 can be implemented with a tape library, optical library, one or more independent hard disk drives, or multiple hard disk drives in a redundant array of independent disks (RAID). Similarly, data in database 165 may conform to any suitable storage architecture known in the art, such as a file, a relational database, an object-oriented database, and/or one or more tables. Database 165 may store data such as identifiers and network paths of devices 105A-105N and applications registered with KPI server 140, KPIs, historical telemetry data (e.g., time series data), and the like.

Client device 170 includes a network interface 171, a controller 172 (e.g., a processor and/or microprocessor), and memory 175 with an administration module 180. In various embodiments, client device 170 may include any programmable electronic device capable of executing computer readable program instructions. Network interface 171 may include one or more network interface cards that enable components of client device 170 to send and receive data over a network, such as network 135. Client device 170 may include internal and external hardware components, as depicted and described in further detail with respect to FIG. 6.

Administration module 180 may enable a user of client device 170, such as network operator, to provide input to recommendation module 150 and/or device manager 155 to manage network monitoring, updating, and maintenance tasks. In particular, administration module 180 may enable a user to receive recommendations for KPIs for network devices. A user of client device 170 may manage configurations, maintenance operations, checks, and devices using a user interface as depicted and described in further detail with respect to FIG. 5.

According to an example embodiment of a method of determining KPIs, a network device's configuration and operational information (including operational sensors) may be obtained and analyzed. Inapplicable operational information may be filtered out based on the network device's configuration. In some implementations, the KPI server 140 may filter out any KPIs that are determined to be inapplicable based on a term of a sensor string representing the operational sensors of a KPI not being found in a string representing configuration information. For example, a certain operational sensor may not be relevant to certain configurations of the network device, so that operational sensor may be omitted when recommending a KPI. Using customized functional lists including blacklists, whitelists, greylists, and/or other weighted scales, KPIs are ranked based on a configuration of the network device and its role in the network.

Figure 2:
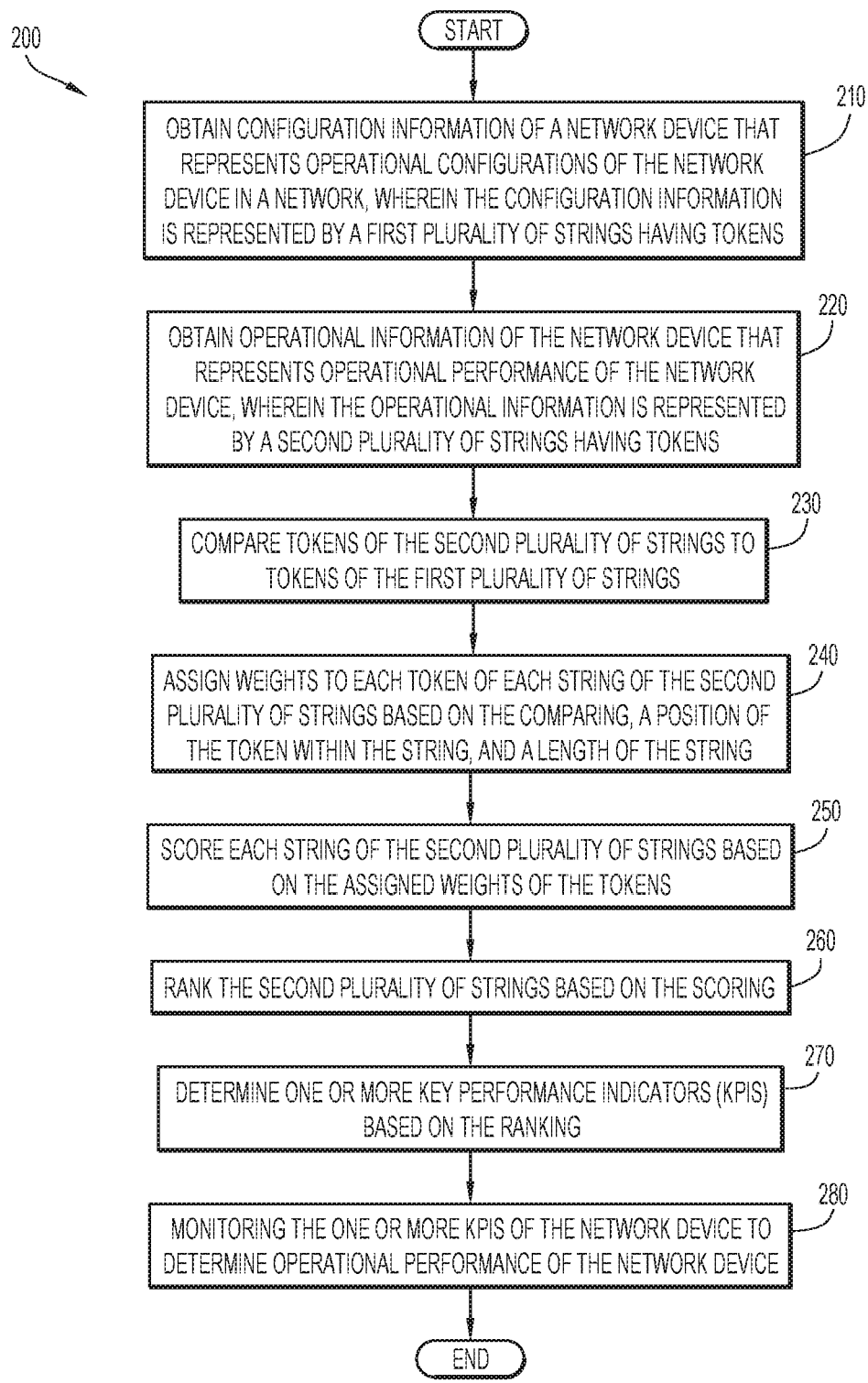
FIG. 2 is a flow chart depicting a method of recommending key performance indicators, in accordance with an example embodiment.

Reference is now made to FIG. 2. FIG. 2 is a flow chart depicting a method 200 of determining key performance indicators, in accordance with an example embodiment. KPI server 140 may be representative of a server configured to perform the method 200 to determine KPIs for one or more network devices 105A-105N, however, embodiments are not limited thereto.

In operation 210, configuration information of a network device, that represents operational configurations of the network device in a network, is obtained by a server. That is, the configuration information relates to how the network device is operationally configured. The configuration information may be represented by a first plurality of strings. In some implementations, the configuration information may further include a plurality of strings representative of all possible configurations of the network device, including the first plurality of strings. That is, the network device may include a superset of strings representative of all possible configurations of the network device, but those configurations may not be enabled. Each string may be made up of a path name or module name, e.g., "Cisco-IOS-XR-ipv4-ospf-cfg", followed by a colon (":") and a plurality of terms (e.g., tokens) separated by a forward slash ("/"). Below are example strings representing paths for configuration information.

(1) Cisco-IOS-XR-ipv4-ospf-cfg:ospf/processes/process[process-name]/vrfs/vrf[vrf-name]/area-addresses/area-area-id[area-id]/area-scope/network-type
(2) Cisco-IOS-XR-ipv4-ospf-cfg:ospf/processes/process[process-name]/vrfs/vrf[vrf-name]/area-addresses/area-area-id[area-id]/area-scope/hell o-interval
(3) Cisco-IOS-XR-ipv4-ospf-cfg:ospf/processes/process[process-name]/vrfs/vrf[vrf-name]/area-addresses/area-area-id[area-id]/area-scope/loopback-stub-network In operation 220, operational information of the network device, that represents operational performance of the network device, is obtained by the server. The operational information may be generated after the network device has been configured and initiated. The operational information may be represented by a second plurality of strings. Each string may be made up of a path name or module name, e.g., "Cisco-IOS-XR-ipv4-ospf-oper", followed by a colon (":") and a path—a plurality of terms (e.g., tokens) separated by a forward slash ("/"). Below are example strings representing paths for operational information.

Figure 4:
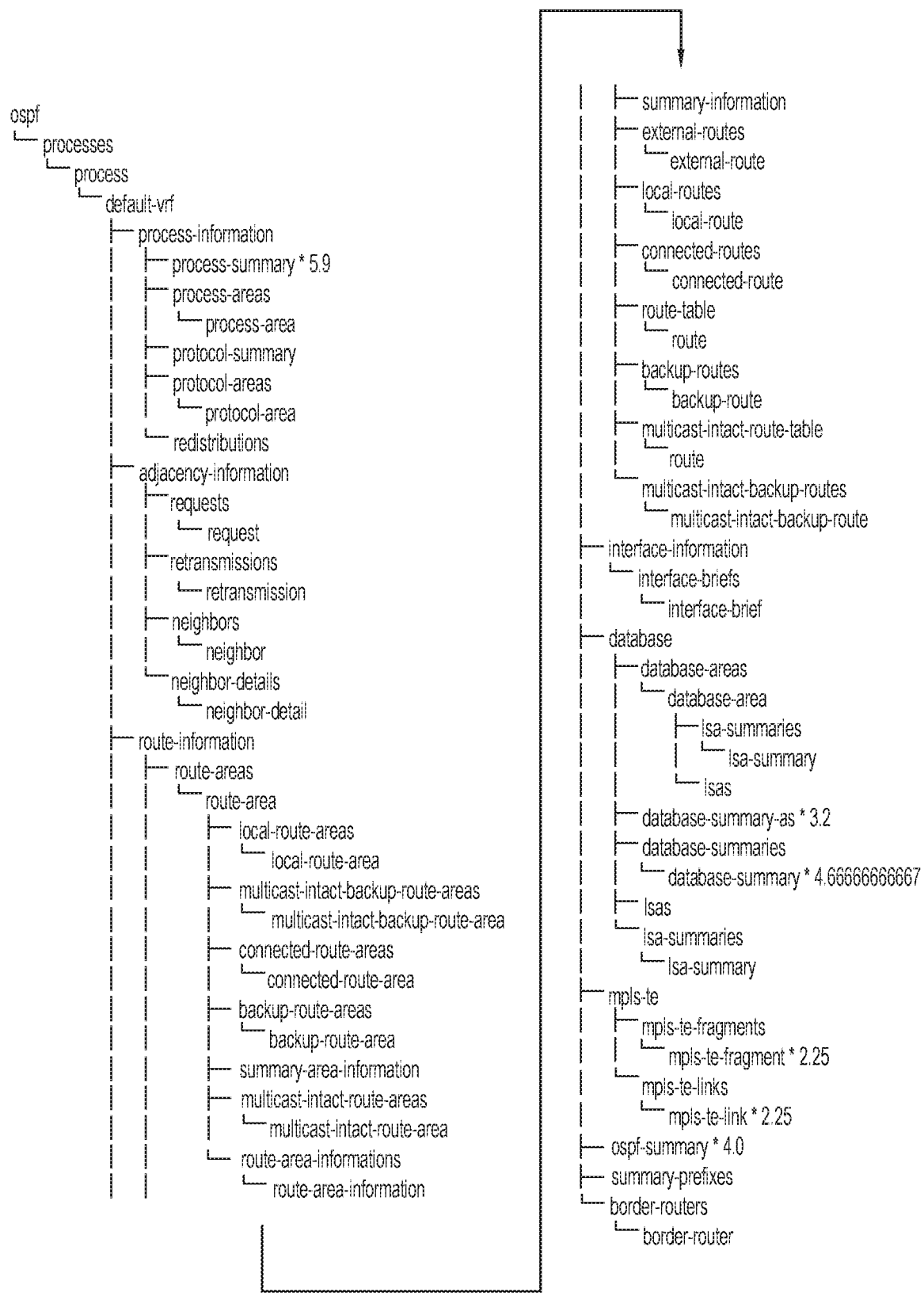
FIG. 4 is a node tree representing strings corresponding to operational information for a particular network device configuration, in accordance with an example embodiment.

(1) Cisco-IOS-XR-ipv4-ospf-oper:ospf/processes/process[process-name]/vrfs/vrf[vrf-name]/adjacency-information/neighbor-details/neighbor-detail/neighbor-summary/neighbor-state
(2) Cisco-IOS-XR-ipv4-ospf-oper:ospf/processes/process[process-name]/vrfs/vrf[vrf-name]/adjacency-information/neighbor-details/neighbor-detail/neighbor-summary/dr-bdr-state
(3) Cisco-IOS-XR-ipv4-ospf-oper:ospf/processes/process[process-name]/vrfs/vrf[vrf-name]/adjacency-information/neighbor-details/neighbor-detail/neighbor-summary/neighbor-dead-timer
(4) Cisco-IOS-XR-ipv4-ospf-oper:ospf/processes/process[process-name]/vrfs/vrf[vrf-name]/adjacency-information/neighbor-details/neighbor-detail/neighbor-summary/neighbor-up-time
(5) Cisco-IOS-XR-ipv4-ospf-oper:ospf/processes/process[process-name]/vrfs/vrf[vrf-name]/adjacency-information/neighbor-details/neighbor-detail/neighbor-summary/neighbor-madj-interface As an example, a path, or string, may be a representation of a leaf item on a tree representation of a configuration or operational YANG module which shows all the nodes to be traversed to reach the leaf containing the packet of information. FIG. 3 depicts a tree representation of a structure of a configuration YANG module, and FIG. 4 depicts an operational YANG module in tree representation, for example. As shown in FIGS. 3 and 4, each token may represent a node and/or leaf of the configuration and operational YANG module, respectively. The string may be in XML Path Language (XPath). In some implementations, the device operational information may be obtained by a server in the form of text via command-line interface (CLI) command output or in the form of XML document via the Network Configuration Protocol (NETCONF) protocol. The trees in FIGS. 3 and 4 are examples only, and may not correlate exactly to the above presented strings.

In operation 230, tokens of the second plurality of strings (e.g., operational strings) are compared to tokens of the first plurality of strings (e.g., configuration strings). For example, tokens may be extracted from the first plurality of strings, representing the configuration information, to generate a first set of tokens, or configuration token set. A second set of tokens, or operational token set, may be generated by extracting tokens from the second plurality of strings, representing the operational information. In some implementations, a superset of tokens, or configuration superset, may be generated by extracting tokens from the superset of configuration strings. The superset of configuration strings may be representative of information representative of all possible configurations of the device. In some implementations, the configuration information maybe be represented as a YANG model. In some implementations, the configuration token set may be compared to the operational token set. In some implementations, the configuration token set may be compared to the superset of tokens.

A penalty list may be generated based on the comparison. For example, any token in the configuration superset that does not substantially match the configuration token set may be added to the penalty list. Alternatively, or additionally, any token in operational token set (e.g., second set of tokens) that does not substantially match the configuration token set (e.g., first set of tokens) may be added to the penalty list. A token in the configuration superset, or operational token set, may substantially match a token in the configuration token set if the root word for the two tokens are the same, or if the token in the configuration superset, or operational token set, is a synonym of a token from the configuration token set. That is, if the token in the configuration superset has a similar meaning as a token in configuration token set, the two tokens substantially match. However, if a token from the configuration superset does not have a similar meaning, or does not substantially match a token from the configuration token set, the token may be added to the penalty list. Because, the penalty list is based on the actual configuration of the device (e.g., configuration token set), the penalty list may change according to the configuration of the device. Thus, the penalty list may be dynamically generated each time the method is performed.

In some implementations, tokens of the operational token set are compared to tokens from the penalty list. A string representative of a portion of operational information having an operational token which matches the penalty list may be filtered out or removed from the second plurality of strings. For example, a token in the operational token set of a string may substantially match a token in the penalty list if the root word from the two tokens are the same, or if the token in the operational token set is a synonym of a token from the penalty list. That is, if the token in the operational token set has a similar meaning as a token in the penalty list, the two tokens substantially match. In response to the operational token of the string substantially matching a token in the penalty list, the whole string may be filtered out, or removed from, the second plurality of strings and the filtered or removed string will not proceed the rest of ranking process.

In operation 240, each token of the second plurality of strings is assigned a weight. That is, each token may be assigned a numerical value based on the relevance or importance of the token, a position of the token within the path/string, and a length of the path/string—defined as the number of tokens in the path/string. For example, each token of the second plurality of strings may be extracted from the string and compared to functional lists (e.g., a whitelist, a greylist, and/or a blacklist) and configuration token set, and assigned a corresponding value representing a relevance or importance of the token. For example, a whitelist may be a predetermined set of words that are relevant to both plurality of strings representing the configuration information and operational information. That is, the whitelist may include terms that may provide meaning to the important/preferred information represented by a string. The greylist may be a predetermined set of words that may be common to both the first and second plurality of strings representing the configuration and operational information, but may have neutral relevance. That is, the greylist may include terms that are generally used to create a string but do not provide much meaning to the information the string represents. The blacklist may be a predetermined set of words that are relevant to both the strings representing the configuration information and the strings representing operational information, but may not be representative of useful information for the purposes of being used as a KPI. For example, the blacklist may include terms that indicate the string is representative of a large dataset or other information not suitable or not preferred for use as a KPI.

In some implementations, a token that substantially matches a term found in either of the whitelist, greylist, blacklist and/or configuration token set is assigned a value or weight corresponding to that list. As noted above, a token substantially matches a term in a list if the root word for the token is the same for a term within the list or if the token in is a synonym of the term from the list. For example, if the token has a similar meaning as a term in a list, the token and the term from the list substantially matches. However, if a token does not have the same root, is not a synonym, or does not have similar meaning as a term in the one of the lists, the token and term do not substantially match.

As an example, if a token from the second plurality of strings (operational token set)—corresponding to performance or operational information—substantially matches a term found in the configuration token set, it is given a neutral numerical value, e.g. one (1). If the token matches a term in the greylist, it is given a medium high numerical value, e.g., two (2). If the token matches a term found in the whitelists it is given a high numerical value, e.g., three (3), as compared to tokens found in the greylist. If the token matches a term found in the blacklist, it is given a high negative numerical value, e.g., negative ten (−10) as compared to the greylist. The above noted values for each list are examples only and embodiments are not limited thereto. The respective values corresponding to each list may be set at any value to provide greater weight to tokens in the whitelist, less weight to tokens found in the greylist, neutral weight to tokens found in the configuration token set, and much less weight to tokens found in the blacklist.

In some implementations, relevant tokens, e.g. tokens corresponding to the whitelist, positioned at or near an end of a string corresponding to operational information may imply the string may be useful or more important as a KPI. Tokens assigned negative values are not further weighted. Accordingly, tokens assigned positive numerical values, e.g. tokens corresponding to the whitelist, may be further weighted based on the position of the token within the string and the length of the string. For example, a token having a positive value may be further weighted by multiplying the assigned positive value by a ratio of the position of the token within the string to a length of the string. Thus, tokens assigned with a positive value and are positioned at or near the end of the string may have a greater weight than tokens assigned with a positive value positioned at or near a beginning of the string. For example, a string may have (n) number of tokens and a token may have a position (i) within the string. Each token assigned with a positive value (e.g., a token matching a term in the whitelist and/or greylist and/or configuration token set), may be further weighted by multiplying the positive value by the ratio i/n. For example, a token with a positive value in an eighth position (i=8) of a string having ten tokens (n=10) may be weighted by 0.8. As a further example, a second token with a positive value in a second position (i=2) of a string having ten tokens (n=10) may be weighted by 0.2. Thus, a relevant token at or near the end of a string corresponding to operational information may be given greater weight than tokens at or near the beginning of the string.

In operation 250, each string of the second plurality of strings (e.g., strings representative of operational information) is scored based on the assigned weights of the tokens. That is, for each string, the weighted values of the tokens are summed. For example, a string having tokens corresponding to the whitelist, greylist and configuration token set, and assigned the following positive values [0.2, 0.4, 0.9, 1.2, 1.0, 1.8, 1.4, 2.4, 2.7, 3.0] will have a score of fifteen (15). That is, the sum of 0.2+0.4+0.9+1.2+1.0+1.8+1.4+2.4+2.7+3.0=15. As another example, a string having eight tokens corresponding to the whitelist and/or greylist and/or configuration token set, and two tokens corresponding to the blacklist, may have the following values [0.2, 0.4, 0.6, −10, 1.0, 1.2, 1.4, 1.6, 2.7, −10], and a score of −10.9. That is, the sum of 0.2+0.4+0.6+−10+1.0+1.2+1.4+1.6+2.7+−10=−10.9. As discussed above, tokens corresponding to the blacklist are assigned a high negative value, or weight.

Having as few as one or two tokens corresponding to the blacklist in a string may significantly lower the score of the string.

In operation 260, the second plurality of strings (e.g., strings representative of operational information) are ranked based on the scoring. That is, the second plurality of strings are ranked from a highest score to a lowest score.

In operation 270, one or more KPIs may be determined based on the ranking. For example, a high score may represent a string with tokens corresponding to the whitelist, greylist, and/or configuration token set. Thus, the string may correspond to information that may be useful as a KPI. A low or negative score represents a string with tokens corresponding to the blacklist. Therefore, the low or negative score indicates the string may not correspond to information that is a useful as a KPI and may be filtered out by the ranking. In some implementations, the KPIs may be determined based on the highest ranking strings with positive scores and the operational information represented by those highest ranking strings are selected as KPIs. In some implementations, the KPIs may be determined based on the highest ranking strings with scores meeting a criteria. For example, all operational information represented by strings with scores above a predetermined threshold value may be selected as KPIs. Further, any operational information represented by strings having scores below a threshold value may be removed from a list of possible KPIs. In some implementations, a KPI may include a plurality of strings having a high rank and some strings having a low rank. The low ranking strings may be filtered or removed from the KPI leaving only the high ranking strings in the KPI. In some implementations, a KPI score is computed by weighted sum of each string score, and ranked in recommending KPIs.

In operation 280, the determined one or more KPIs of a given network device are monitored to determine an operational performance of the network device. In some implementations, the operational performance of the network may be adjusted in response to the KPIs meeting a criteria.

Reference is now made to FIG. 5. FIG. 5 is a diagram of an example graphical user interface (GUI) 500 for providing KPIs of a network device, in accordance with an example embodiment. The network device may be representative of any of the network devices 105A-105N of FIG. 1. The graphical user interface may include a network device table 502 and recommended KPIs table 504. In response to a user's selection of a network device from the network device table 502, one or more KPIs may be recommended based on a configuration of the device. For example, a KPI server 140 may obtain configuration and operational information for the selected device from the network device table 502 and generate a ranked list of KPIs in the recommend KPIs table 504 using the method 200 described above. The recommend KPIs table 504 may list the KPIs in order from highest rank to lowest rank. The recommended KPIs in table 504 may be representative of one or more strings representing operational data. For example, the first KPI in the recommended KPI table 504 is named "CPU threshold" and may comprise a plurality of strings representative of operational data that may be useful for a KPI for the selected device.

The GUI 500 provides an intuitive and easy approach for a user to select KPIs for monitoring a device. As noted above, each KPI may comprise a plurality of strings representing operational data. The operational data that is represented by the strings themselves may not be apparent to a user. Each string must be analyzed based on the configuration of the device to determine whether the string of the KPI is relevant. Accordingly, listing every possible string representing operational information, or every possible performance sensor, for a device may not be useful to a user, because the user may not be able to determine which string represents operational information that may be useful in monitoring the performance of a selected device.

The GUI 500 improves the system's performance by automatically presenting to the user in a single display the most relevant KPIs in table 504 to control a selected device from device table 502. The system performance is improved over conventional systems by gathering all of KPIs and ranking them in order of relevance based on the configuration of the network device from table 502. In conventional systems, a user cycles through a plurality of windows of a GUI to determine where the paths of the KPIs lead. The user would then have to determine whether the paths of the KPIs are representative of useful data. The cycling of extra windows and menus through GUI and generation of all the sensor paths, or strings, for a particular KPI may impact processing load of a server providing the GUI. The GUI 500 overcomes the excess processing load of conventional systems by providing a ranked list of KPIs in table 504 based on a configuration of a select device from table 502 within a single window of a GUI.

Figure 6:
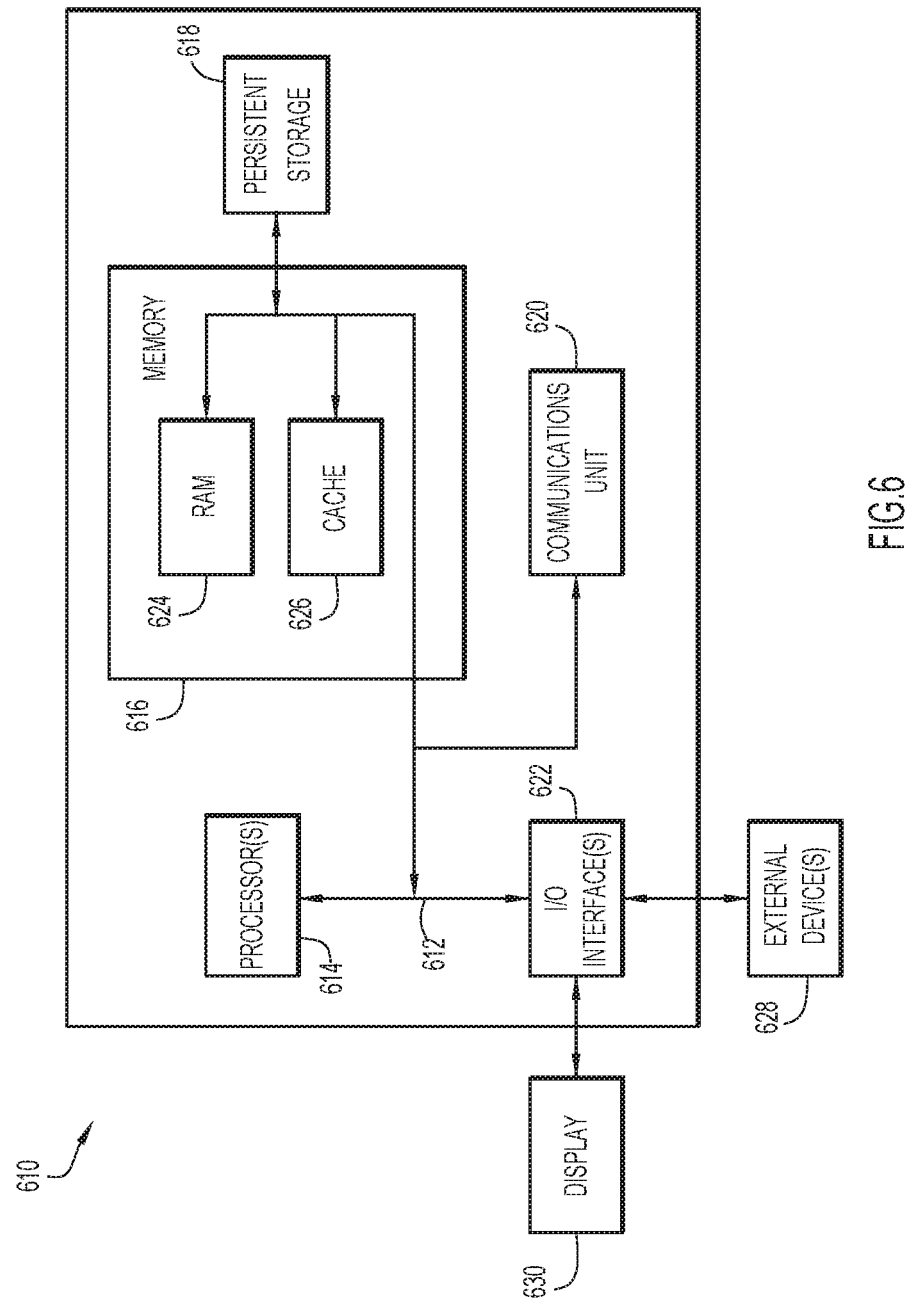
FIG. 6 is a block diagram depicting a computing device configured to perform the methods presented herein, in accordance with an example embodiment.

Reference is now made to FIG. 6. FIG. 6 is a block diagram depicting components of a computer 610 suitable for executing the methods disclosed herein. Computer 610 may serve as KPI server 140 and/or client device 170 in accordance with embodiments presented herein. It should be appreciated that FIG. 6 provides only an illustration of one embodiment and does not imply any limitations with regard to the environments in which different embodiments may be implemented. Many modifications to the depicted environment may be made.

As depicted, the computer 610 includes communications fabric 612, which provides communications between computer processor(s) 614, memory 616, persistent storage 618, communications unit 620, and input/output (I/O) interface(s) 622. Communications fabric 612 can be implemented with any architecture designed for passing data and/or control information between processors (such as microprocessors, communications and network processors, etc.), system memory, peripheral devices, and any other hardware components within a system. For example, communications fabric 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. The memory 616 may store the software instructions for telemetry module 130, recommendation module 150, device manager 155, and/or administration module 180 in performing the operations described herein.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to computer 610. For example, I/O interface 622 may provide a connection to external devices 628 such as a keyboard, keypad, a touch screen, and/or some other suitable input device. External devices 628 can also include portable computer readable storage media such as, for example, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data, e.g., GUI 500, to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to recommending key performance indicators (e.g., device information, telemetry data, KPI information, etc.) may be stored within any conventional or other data structures (e.g., files, arrays, lists, stacks, queues, records, etc.) and may be stored in any desired storage unit (e.g., database, data or other repositories, queue, etc.). The data transmitted between devices 105A-105N, KPI server 140, and/or client device 170 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to recommending key performance indicators (e.g., device information, telemetry data, KPI information, etc.) may include any information provided to, or generated by, devices 105A-105N, KPI server 140, and/or client device 170. Data relating recommending key performance indicators may include any desired format and arrangement, and may include any quantity of any types of fields of any size to store any desired data. The data relating to recommending key performance indicators may include any data collected about entities by any collection means, any combination of collected information, and any information derived from analyzing collected information.

The present embodiments may employ any number of any type of user interface (e.g., representational state transfer (REST) application programming interfaces (API), Graphical User Interface (GUI), command-line, prompt, etc.) for obtaining or providing information (e.g., data related to recommending key performance indicators) where the interface may include any information arranged in any fashion. The interface may include any number of any types of input or actuation mechanisms (e.g., REST APIs, buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of recommending key performance indicators based on a relevancy ranking.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, mobile devices, etc.), and may include any commercially available operating system and any combination of commercially available and custom software (e.g., networking software, server software, telemetry module 130, recommendation module 150, device manager 155, administration module 180, etc.). These systems may include any types of monitors and input devices (e.g., keyboard, mouse, voice recognition, etc.) to enter and/or view information.

It is to be understood that the software (e.g., networking software, server software, telemetry module 130, recommendation module 150, device manager 155, administration module 180, etc.) of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments (e.g., networking software, server software, telemetry module 130, recommendation module 150, device manager 155, administration module 180, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Python, Go, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

The communication network may be implemented by any number of any type of communication network (e.g., LAN, WAN, Internet, Intranet, VPN, etc.). The computer or other processing systems of the present embodiments may include any conventional or other communication devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to recommending key performance indicators). The database system may be included within or coupled to the server and/or client systems. The database systems and/or storage structures may be remote from or local to the computer or other processing systems, and may store any desired data (e.g., data relating to recommending key performance indicators).

According to an example embodiment, a method includes obtaining, at a server, configuration strings that represent all possible configurations of a network device in a network, wherein the configuration strings includes tokens. The method further includes obtaining, at the server, configuration information of the network device that represents operational configurations of the network device, wherein the configuration information is represented by a subset of configuration strings having a configuration token set. The method further includes obtaining, at the server, operational information of the network device that represents operational performance of the network device, wherein the operational information is represented by operational strings having tokens. The method further includes comparing the tokens of the configuration strings to the configuration token set, generating a penalty list of tokens based on the comparison, comparing the tokens of the operational strings to tokens in the penalty list, and generating a subset of operational strings by removing strings from the operational strings which include tokens that substantially match tokens in the penalty list. Weights are assigned to each token of the subset of operational strings based on functional lists and the configuration token set, a position of the token within a string of the subset of operational strings, and a length of the string. Each string of the subset of operational strings is scored based on the weights assigned to the tokens and then ranked based on the scores to produce a ranking. One or more key performance indicators (KPIs) of the network device are determined based on the ranking and monitored to determine operational performance of the network device in the network.

In one form of the method, each token of a string, of the subset of operational strings, represents a node to be traversed to reach a leaf node containing the operational information of the string.

In one form of the method, the penalty list of tokens comprises tokens from the configuration strings that do not substantially match tokens of the subset of configuration strings.

In one form of the method, assigning weights to each token of the subset of operational strings by extracting each token for each string of the subset of operational strings; and comparing each token of the extracted tokens to at least one of a whitelist, a blacklist, and a greylist and configuration token set. The whitelist comprises a first set of terms, the blacklist comprises a second set of terms, and the greylist comprises a third set of terms. The configuration token set comprises a fourth set of terms.

In one form of the method, the assigning weights further includes assigning a first weight to tokens substantially matching terms in the whitelist, assigning a second weight to tokens substantially matching terms in the blacklist, the second weight being negative, and assigning a third weight to tokens substantially matching terms in the greylist, the third weight being less than the first weight, and assigning a fourth weight to tokens substantially matching terms in the configuration token set, the fourth weight being less than the second weight. In some implementations, an absolute value of the second weight is greater than the first weight.

In one form of the method, the assigning weights further includes assigning each token a further weight based on a ratio of its position within the string versus the length of the string.

In one form of the method, the scoring comprises summing the weights of the tokens for each string to determine a total weight of each string.

According to another example embodiment a system includes a database configured to store key performance indicators (KPIs) for a network device in a network, and a server configured to obtain configuration strings that represent all possible configurations of a network device in a network, wherein the configuration strings includes tokens, obtain configuration information of the network device that represents operational configurations of the network device, wherein the configuration information is represented by a subset of configuration strings having a configuration token set, and obtain operational information of the network device that represents operational performance of the network device, wherein the operational information is represented by operational strings having tokens. The server is further configured to compare the tokens of the configuration strings to the configuration token set, generate a penalty list of tokens based on the comparison, compare the tokens of the operational strings to tokens in the penalty list, and generate a subset of operational strings by removing strings from the operational strings which include tokens that substantially match tokens in the penalty list. The server is further configured to assign weights to each token of the subset of operational strings based on functional lists and configuration token set, a position of the token within a string of the subset of operational strings, and a length of the string; score each string of the subset of operational strings based on the weights assigned to the tokens; and rank each string of the subset of operational strings based on the scoring to produce a ranking. The server is further configured to determine one or more key performance indicators (KPIs) of the network device based on the ranking; and monitor the one or more KPIs of the network device to determine operational performance of the network device in the network.

In one form of the system, the penalty list of tokens comprises tokens from the configuration strings that do not substantially match tokens of the subset of configuration strings.

In one form of the system, the server is further configured to extract each token for each string of the subset of operational strings, and compare each token of the extracted tokens to at least one of a whitelist, a blacklist, and a greylist and configuration token set, wherein the whitelist comprises a first set of terms, the blacklist comprises a second set of terms, and the greylist comprises a third set of term, and the configuration token set comprises a fourth set of term. The server is further configured to assign a first weight to tokens substantially matching terms in the whitelist, assign a second weight to tokens substantially matching terms in the blacklist, the second weight being negative, and assign a third weight to tokens substantially matching terms in the greylist, the third weight being less that the first weight, and assign a fourth weight to tokens substantially matching terms in the configuration token set, the fourth weight being less than the third weight.

In yet another an example embodiment, a method includes obtaining, at a server, configuration information of a network device that represents operational configurations of the network device in a network. The configuration information is represented by a first plurality of strings having tokens. The method further includes obtaining, at the server, operational information of the network device that represents operational performance of the network device, wherein the operational information is represented by a second plurality of strings having tokens. The method further includes comparing the tokens of the second plurality of strings to the tokens of the first plurality of strings and assigning weights to each token of the second plurality of strings based on the comparing, a position of the token within a string of the second plurality of strings, and a length of the string. The method further includes scoring each string of the second plurality of strings based on the weights assigned to the tokens and ranking the second plurality of strings based on the scoring to produce a ranking. The method further includes determining one or more key performance indicators (KPIs) of the network device based on the ranking, and monitoring the one or more KPIs of the network device to determine operational performance of the network device in the network.

In one form of the method, each token of a string, of the second plurality of strings, represents a node to be traversed to reach a leaf node containing the operational information of the string.

In one form of the method, comparing the tokens of the second plurality of strings to the tokens of the first plurality of strings includes generating a penalty list comprising tokens from the second plurality of strings not found in the first plurality of strings.

In one form, the method further includes removing from the ranking strings with tokens corresponding to the penalty list.

In one form, the method further includes extracting the tokens for each string of the second plurality of strings and comparing each token of the extracted tokens to at least one of a whitelist, a blacklist, a greylist, and the penalty list. The whitelist includes a first set of terms, the blacklist includes a second set of terms, and the greylist includes a third set of terms.

In one form of the method, assigning weights includes assigning a first weight to tokens substantially matching terms in the whitelist; assigning a second weight to tokens substantially matching terms in the blacklist, the second weight being negative; and assigning a third weight to tokens substantially matching terms in the greylist, the third weight being less that the first weight.

In one form of the method, an absolute value of the second weight is greater than the first weight.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the present embodiments in the form disclosed. Many modifications and variations will be apparent to those of ordinary skill in the art without departing from the scope and spirit of the presented embodiments. The embodiment was chosen and described in order to best explain the principles of the presented embodiments and the practical application, and to enable others of ordinary skill in the art to understand various embodiments with various modifications as are suited to the particular use contemplated.

The embodiments presented may be in various forms, such as a system, a method, graphical user interface and/or a computer program product at any possible technical detail level of integration. The computer program product may include a computer readable storage medium (or media) having computer readable program instructions thereon for causing a processor to carry out aspects of the presented embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, RAM, ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining, at a server, configuration strings that represent all possible configurations of a network device in a network, wherein the configuration strings includes tokens,
   obtaining, at the server, configuration information of the network device that represents operational configurations of the network device, wherein the configuration information is represented by a subset of configuration strings, the subset of configuration strings having a configuration token set;
   obtaining, at the server, operational information of the network device that represents operational performance of the network device, wherein the operational information is represented by operational strings having tokens;
   comparing the tokens of the configuration strings to the tokens of the configuration token set;
   generating a penalty list of tokens based on comparing the tokens of the configuration strings to the tokens of the configuration token set;
   comparing the tokens of the operational strings to tokens in the penalty list;
   generating a subset of operational strings by removing strings from the operational strings which include tokens that substantially match tokens in the penalty list;
   assigning weights to each token of the subset of operational strings based on functional lists and the configuration token set, a position of the token within a string of the subset of operational strings, and a length of the string;
   scoring each string of the subset of operational strings based on the weights assigned to the tokens;
   ranking each string of the subset of operational strings based on the scoring to produce a ranking;
   determining one or more key performance indicators (KPIs) of the network device based on the ranking; and
   monitoring the one or more KPIs of the network device to determine operational performance of the network device in the network.

2. The method of claim 1, wherein each token of a string, of the subset of operational strings, represents a node to be traversed to reach a leaf node containing the operational information of the string.

3. The method of claim 1, wherein the penalty list of tokens comprises tokens from the configuration strings that do not substantially match tokens of the configuration token set.

4. The method of claim 1, wherein assigning weights to each token of the subset of operational strings comprises:
   extracting each token for each string of the subset of operational strings; and
   comparing each token of the extracted tokens to at least one of a whitelist, a blacklist, a greylist and configuration token set,
   wherein the whitelist comprises a first set of terms, the blacklist comprises a second set of terms, and the greylist comprises a third set of terms, and the configuration token set comprises a fourth set of terms.

5. The method of claim 4, further comprising:
   assigning a first weight to tokens substantially matching terms in the whitelist;
   assigning a second weight to tokens substantially matching terms in the blacklist, the second weight being negative;
   assigning a third weight to tokens substantially matching terms in the greylist, the third weight being less than the first weight; and
   assigning a fourth weight to tokens substantially matching terms in the configuration token set, the fourth weight being less than the third weight.

6. The method of claim 5, wherein an absolute value of the second weight is greater than the first weight.

7. The method of claim 6, further comprising:
assigning each token a further weight based on a ratio of its position within the string versus the length of the string.

8. The method of claim 1, wherein the scoring comprises summing the weights of the tokens for each string to determine a total weight of each string.

9. A system comprising:
a database configured to store key performance indicators (KPIs) for a network device in a network; and
a server configured to:
obtain configuration strings that represent all possible configurations of a network device in a network, wherein the configuration strings includes tokens;
obtain configuration information of the network device that represents operational configurations of the network device, wherein the configuration information is represented by a subset of configuration strings, the subset of configuration strings having a configuration token set;
obtain operational information of the network device that represents operational performance of the network device, wherein the operational information is represented by operational strings having tokens;
compare the tokens of the configuration strings to the configuration token set;
generate a penalty list of tokens based on comparing the tokens of the configuration strings to the configuration token set;
compare the tokens of the operational strings to tokens in the penalty list;
generate a subset of operational strings by removing strings from the operational strings which include tokens that substantially match tokens in the penalty list;
assign weights to each token of the subset of operational strings based on functional lists and the configuration token set, a position of the token within a string of the subset of operational strings, and a length of the string;
score each string of the subset of operational strings based on the weights assigned to the tokens;
rank each string of the subset of operational strings based on the scoring to produce a ranking;
determine one or more key KPIs of the network device based on the ranking; and
monitor the one or more KPIs of the network device to determine operational performance of the network device in the network.

10. The system of claim 9, wherein the penalty list of tokens comprises tokens from the configuration strings that do not substantially match tokens of the subset of configuration strings.

11. The system of claim 9, wherein the server is further configured to:
extract each token for each string of the subset of operational strings;
compare each token of the extracted tokens to at least one of a whitelist, a blacklist, a greylist and the configuration token set, wherein the whitelist comprises a first set of terms, the blacklist comprises a second set of terms, and the greylist comprises a third set of terms, and the configuration token set comprises a fourth set of terms;
assign a first weight to tokens substantially matching terms in the whitelist;
assign a second weight to tokens substantially matching terms in the blacklist, the second weight being negative;
assign a third weight to tokens substantially matching terms in the greylist, the third weight being less than the first weight; and
assign a fourth weight to tokens substantially matching terms in the configuration token set, the fourth weight being less than the third weight.

12. A method comprising:
obtaining, at a server, configuration information of a network device that represents operational configurations of the network device in a network, wherein the configuration information is represented by a first plurality of strings having tokens;
obtaining, at the server, operational information of the network device that represents operational performance of the network device, wherein the operational information is represented by a second plurality of strings having tokens;
comparing the tokens of the second plurality of strings to the tokens of the first plurality of strings;
assigning weights to each token of the second plurality of strings based on the comparing, a position of the token within a string of the second plurality of strings, and a length of the string;
scoring each string of the second plurality of strings based on the weights assigned to the tokens;
ranking the second plurality of strings based on the scoring to produce a ranking;
determining one or more key performance indicators (KPIs) of the network device based on the ranking; and
monitoring the one or more KPIs of the network device to determine operational performance of the network device in the network.

13. The method of claim 12, wherein each token of a string, of the second plurality of strings, represents a node to be traversed to reach a leaf node containing the operational information of the string.

14. The method of claim 12, wherein comparing the tokens of the second plurality of strings to the tokens of the first plurality of strings comprises: generating a penalty list comprising tokens from the second plurality of strings not found in the first plurality of strings.

15. The method of claim 14, further comprising removing from the ranking, strings with tokens corresponding to the penalty list.

16. The method of claim 14, further comprising:
extracting the tokens for each string of the second plurality of strings and comparing each token of the extracted tokens to at least one of a whitelist, a blacklist, a greylist, and the penalty list,
wherein the whitelist comprises a first set of terms, the blacklist comprises a second set of terms, and the greylist comprises a third set of terms.

17. The method of claim 16, wherein assigning weights includes:
assigning a first weight to tokens substantially matching terms in the whitelist;
assigning a second weight to tokens substantially matching terms in the blacklist and/or penalty list, the second weight being negative; and
assigning a third weight to tokens substantially matching terms in the greylist, the third weight being less that the first weight.

18. The method of claim 17, wherein an absolute value of the second weight is greater than the first weight.

19. The method of claim 18, wherein assigning includes:
assigning each token a further weight based on a ratio of its position within the string versus the length of the string, and
assigning each token substantially matching a term in the whitelist less weight than a token exactly matching a term in the whitelist.

20. The method of claim 12, wherein the scoring comprises summing the weights of the tokens for each string to determine a total weight of each string.

\* \* \* \* \*